United States Patent
Grass et al.

(10) Patent No.: US 9,600,913 B2
(45) Date of Patent: Mar. 21, 2017

(54) ITERATIVE CT IMAGE RECONSTRUCTION OF A ROI WITH OBJECTS OUTSIDE THE SCAN FOV

(71) Applicant: KONINKLIJKE PHILIPS N.V., Eindhoven (NL)

(72) Inventors: Michael Grass, Buchholz in der Nordheide (DE); Thomas Koehler, Norderstedt (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/907,585

(22) PCT Filed: Jul. 30, 2014

(86) PCT No.: PCT/EP2014/066323
§ 371 (c)(1),
(2) Date: Jan. 26, 2016

(87) PCT Pub. No.: WO2015/014867
PCT Pub. Date: Feb. 5, 2015

(65) Prior Publication Data
US 2016/0163073 A1    Jun. 9, 2016

(30) Foreign Application Priority Data
Jul. 31, 2013  (EP) .................................. 13178749

(51) Int. Cl.
G06T 11/00      (2006.01)
G06K 9/20       (2006.01)

(52) U.S. Cl.
CPC .......... *G06T 11/006* (2013.01); *G06K 9/2054* (2013.01); *G06T 2211/421* (2013.01); *G06T 2211/424* (2013.01)

(58) Field of Classification Search
USPC .......................................... 382/128, 131, 132
See application file for complete search history.

(56) References Cited

U.S. PATENT DOCUMENTS 7,680,240 B2    3/2010   Manjeshwar et al.
8,433,119 B2 *  4/2013   Deykoon ............... A61B 6/032
                                                     378/15

(Continued)

FOREIGN PATENT DOCUMENTS

WO    2011/021116    2/2011
WO    2012101548     8/2012
WO    2013/038283    3/2013

OTHER PUBLICATIONS

Hsieh, J., et al. "A novel reconstruction algorithm to extend the CT scan field-of-view." Medical physics 31.9 (2004): 2385-2391.*

(Continued)

*Primary Examiner* — Bhavesh Mehta
*Assistant Examiner* — Narek Zohrabyan

(57) ABSTRACT

An image reconstruction apparatus and related method. The amount of out-field-of view material for a CT scanner (IMA) with a given field of view (FoV) in a bore (B) is established. Based on the measurement, a hybrid-image reconstructor (RECONX) is configured to switch between different reconstruction algorithms.

20 Claims, 8 Drawing Sheets

(56) References Cited

U.S. PATENT DOCUMENTS

| | | | |
|---|---|---|---|
| 2007/0116344 A1* | 5/2007 | Hsieh | A61B 6/032 382/131 |
| 2008/0219534 A1* | 9/2008 | Faul | A61B 6/032 382/131 |
| 2008/0226016 A1 | 9/2008 | Koehler et al. | |
| 2008/0240335 A1 | 10/2008 | Manjeshwar et al. | |
| 2010/0054394 A1 | 3/2010 | Thibault et al. | |
| 2011/0188723 A1* | 8/2011 | Bruder | A61B 6/032 382/131 |
| 2012/0141006 A1* | 6/2012 | Koehler | G06T 11/006 382/131 |
| 2012/0155736 A1* | 6/2012 | Faul | A61B 6/032 382/131 |
| 2013/0294570 A1* | 11/2013 | Hansis | A61B 6/5235 378/4 |
| 2013/0301894 A1* | 11/2013 | Bruder | G06T 11/003 382/131 |
| 2014/0003688 A1* | 1/2014 | Hansis | A61B 6/032 382/130 |
| 2014/0348407 A1* | 11/2014 | Nielsen | G06T 11/006 382/131 |
| 2015/0190106 A1* | 7/2015 | Yamakawa | A61B 6/032 378/4 |

OTHER PUBLICATIONS

Li, Baojun, et al. "An enhanced reconstruction algorithm to extend CT scan field-of-view with z-axis consistency constraint." Medical physics 39.10 (2012): 6028-6034.*

Ohnesorge, B., et al. "Efficient correction for CT image artifacts caused by objects extending outside the scan field of view." Medical physics 27.1 (2000): 39-46.*

Bruder, H., C. Suess, and K. Stierstorfer. "Efficient extended field of view (eFOV) reconstruction techniques for multi-slice helical CT." Medical Imaging. International Society for Optics and Photonics, 2008.*

Zamyatin, Alexander A., and Satoru Nakanishi. "Extension of the reconstruction field of view and truncation correction using sinogram decomposition." Medical physics 34.5 (2007): 1593-1604.*

Ziegler, et al., "Iterative reconstruction of a region of interest for transmission tomography", Med. Phys. 35 (4), 2008, pp. 1317-1327.

Singh, et al., "Adaptive Statistical Iterative Reconstruction Technique for Radiation Dose Reduction in Chest CTRadiology"; vol. 259: No. 2—May 2011.

* cited by examiner

ITERATIVE CT IMAGE RECONSTRUCTION OF A ROI WITH OBJECTS OUTSIDE THE SCAN FOV

CROSS REFERENCE TO RELATED APPLICATIONS

This application is the U.S. National Phase application under 35 U.S.C. §371 of International Application No. PCT/EP2014/066323, filed Jul. 30, 2014, published as WO 2015/014867 on Feb. 5, 2015, which claims the benefit of European Patent Application Number 13178749.1 filed Jul. 31, 2013. These applications are hereby incorporated by reference herein.

FIELD OF THE INVENTION

The present invention relates to an apparatus for computed tomography image reconstruction, to a method of image reconstruction, to a computer program element and to a computer readable medium.

BACKGROUND OF THE INVENTION

Computed tomography (CT) relies on various different reconstruction algorithms. It has been observed however that certain image reconstruction algorithms produce, at times, poor image results plagued by image artifacts.

SUMMARY OF THE INVENTION

There may therefore be a need for an alternative computed tomography image reconstruction apparatus and related method.

The object of the present invention is solved by the subject matter of the independent claims where further embodiments are incorporated in the dependent claims. It should be noted that the following described aspect of the invention equally apply to the method, to the computer program element and to the computer readable medium.

According to a first aspect of the invention there is provided an apparatus for computed tomography image reconstruction of an object, comprising:
  an input port for receiving a plurality of projection images of an object acquired by an imager/scanner along different projection angles related to a reconstruction field of view, FoV, whilst said object resides in a bore of said imager with at least a part of said object inside the FoV;
  a reconstruction module switchable to operate according to any one of at least two different reconstruction algorithms
  an out-of-FoV-determiner configured to measure the amount of material in the annular region formed by the region outside the FoV but inside the bore and configured to instruct the reconstruction module to switch from a first reconstruction algorithm to a second reconstruction algorithm and to reconstruct according to said second reconstruction algorithm if the determined amount of the out-of-FoV material exceeds a threshold;
  an output port (OUT) configured to output the so reconstructed image.

Preferably, the second reconstruction algorithm is less sensitive to the presence out-of-FoV material than the first reconstruction algorithm. In other words the second reconstruction algorithm produces images at higher fidelity than the first reconstruction algorithm given the presence out-of-FoV material. The sensitivity can be readily established by running imaging tests on phantom bodies. Preferably, the reconstruction according to the first or the second reconstruction algorithm includes or is a ROI-only reconstruction.

As proposed, the decision whether to use the first or second reconstruction algorithm is based on image information in image space. In other words, the determiner operates in "image space" rather than "projection space". In one embodiment the image space information is supplied by an optical image taken by a camera (based on non-ionizing radiation) of the imager's bore whilst the object or subject (such as a patient along with possibly other objects such as a blanket, medical equipment, part of the couch on which patient lies, etc.) resides in the bore. In an alternative embodiment, an exploratory image is reconstructed of the full bore. The reconstruction of the full field of view or the full bore of the imager is preferably done by a computationally cheap (that is, relatively fast) algorithm. In one embodiment the reconstruction for the exploratory image is done at a lower resolution than the one at which the first or second reconstruction algorithm is intended to operate. According to one embodiment the reconstruction of the exploratory image is via filtered back projection (FBP). According to one embodiment the first or second reconstruction algorithm is of the "mixed type", that is, includes in particular iterations from different algorithmic techniques. For instance in one embodiment, the first or second reconstruction algorithm include a filter back projection step in which case the exploratory image can be reconstructed by "partial execution" of the first or second algorithm in order to get a decision on the amount (if any) of the out-of-FoV material and then reconstruct accordingly by using the first or the second reconstruction algorithm.

According to one embodiment, the reconstruction according to the first reconstruction algorithm is at a lower resolution than the resolution for the re-reconstruction according to the second reconstruction algorithm. This can further save CPU time.

According to one embodiment, the first reconstruction algorithm delivers a higher signal to noise ratio than the second reconstruction algorithm.

According to one embodiment, the first or second reconstruction algorithm includes or further includes one or more iterations of an iterative reconstruction algorithm.

The iterative reconstruction algorithm can be for instance a statistical iterative reconstruction, SIR or an algebraic reconstruction algorithm, such as the algebraic reconstruction technique, ART.

According to one embodiment, the out-of-FoV measurement is at discrete locations in the annulus or wherein the out-of-FoV measurement is over the whole of the annulus.

According to a preferred embodiment, the ROI only reconstruction according to the first reconstruction algorithm includes an FBP step and one or more SIR or ART iterations. According to a preferred embodiment, the ROI only reconstruction according to the second reconstruction algorithm is like the first reconstruction algorithm but includes an additional (a single or more) ART or SIR iteration to generate a more accurate estimate of the region of interest and to generate more consistent region of interest projections. In other words, it is proposed in one embodiment, to decide, during the ROI reconstruction process, whether the outside of the ROI is reconstructed by using FBP only or by using FBP and a single iteration of ART. Using this approach, a consistent image quality for region of interest reconstruction can be achieved.

According to one embodiment, the decision on whether to switch or not is based on evaluating a sum of the local measurements against the threshold or each local measurement is compared separately with a threshold and the switchover occurs as soon as one measurement is found that exceeds said threshold.

Definitions

An image "reconstruction" algorithm is essentially a transformation from projection space into image space. In other words reconstruction algorithms transform projection measurements/line integrals/sinograms as supplied by the scanner into a slice or transaxial image or volume image of an object in "image space", that is, the space (made up from 3D image elements such as voxels or, more general, "blobs") formed by the scanner's field of view (FoV) or bore. If the transformation is from projection space into image space, this is also referred to as a backward projection, whereas the inverse operation is a forward projection.

A region of interest (ROI) reconstruction algorithm is a reconstruction where the reconstructed image is representative only of a subpart (the region of interest) of the scanner's FoV, that is, the image elements of the reconstructed image do not cover the whole of the FoV.

A "direct inversion" reconstruction algorithm is one where the computation of the values of individual image elements (voxels or pixels) of the reconstructed image does not involve iteration. An example for a direct inversion reconstruction algorithm is the filtered back projection (FBP) algorithm.

An "iterative reconstruction algorithm", is one where the computation of individual image element values does involve iterative steps. Frequently the iteration proceeds alternately in a sequence of forward and backward projection operations in order to ensure convergence of iteratively synthesized (artificially created) projection images towards the actually measured set of projection images. In general, iterative reconstruction algorithms are computationally more expensive than direct inversion reconstruction algorithm but may have the benefit of higher signal to noise ratio or higher image quality.

An iterative reconstruction algorithm is called "algebraic" if it does not use statistical information about the measurement process or device such as the detector used for the image acquisition of the projection images.

An iterative reconstruction algorithm is called statistical (SIR—statistical iterative reconstruction) if it uses, for the computation of the reconstructed image, statistical information or statistical model(s) to capture or model characteristics (such as prevalent noise) about the measurement process or device, in particular the detector, used for the image acquisition of the projection images.

BRIEF DESCRIPTION OF THE DRAWINGS

Exemplary embodiments of the invention will now be described with reference to the following drawings wherein.

DETAILED DESCRIPTION OF EMBODIMENTS

Figure 1:
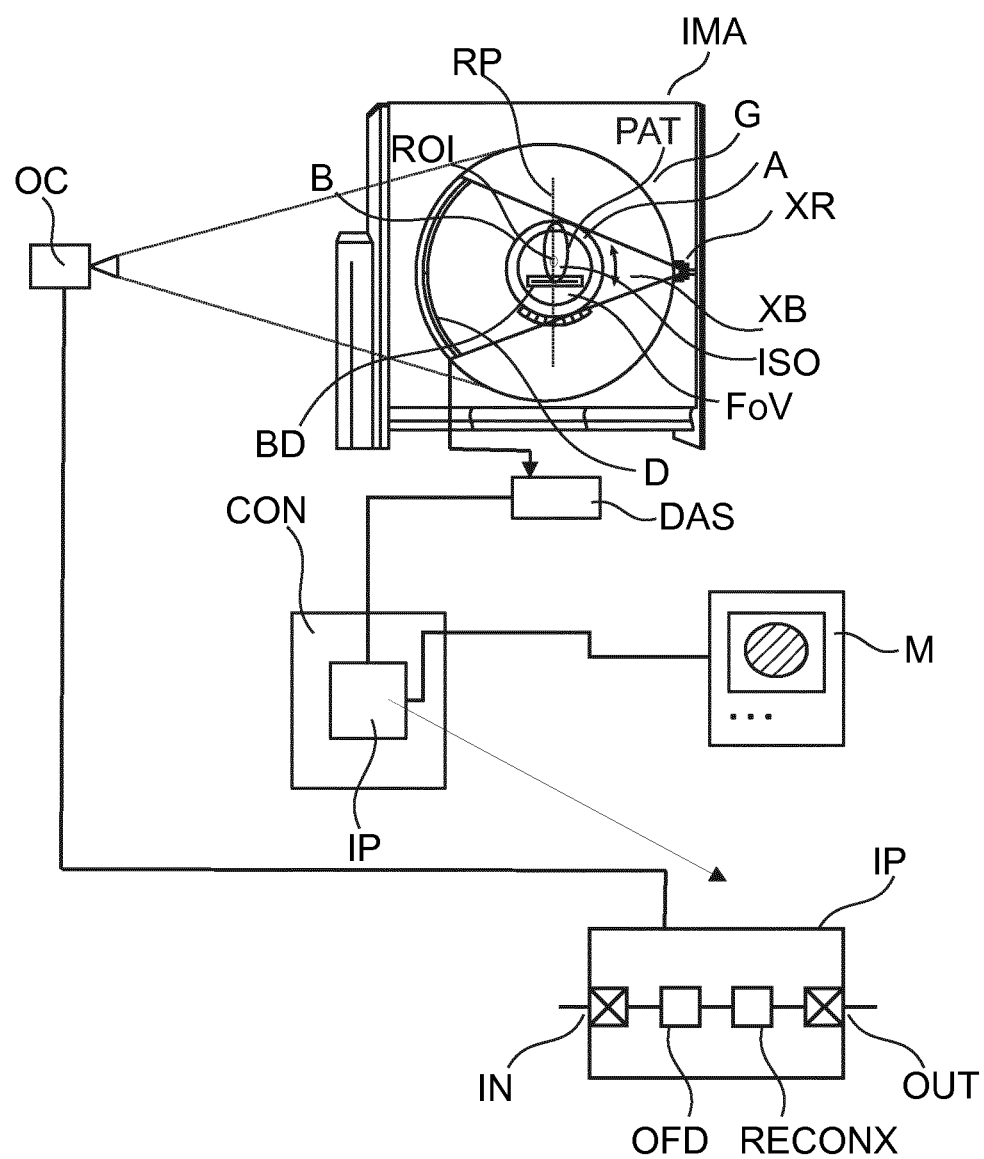
FIG. 1 shows an imaging arrangement including a CT scanner with a scan field of view in a bore.

With reference to FIG. 1, there is shown a CT imaging arrangement. Broadly said imaging arrangement includes an X-ray based CT scanner IMA and a workstation or operating console CON for controlling operation of said scanner IMA.

A general purpose computing system serves as the operator console CON, and includes an output device such as a display and an input device such as a keyboard, mouse, and/or the like. Software resident on the console CON allows the operator to control the operation of the system IMA, for example, allowing the operator to select imaging parameter directly or indirectly through selecting a pre-generated imaging protocol. There is also a display unit such as a monitor M communicatively coupled to console CON to aid inputting control information or to view operational sates of the scanner or to view images supplied by the scanner or of images obtained by image processing the so supplied images.

There is also an image processing module IP that is in one embodiment communicatively coupled to console CON to effect said image processing. Operation of image processing module IP will be explained in more detail further below.

Scanner IMA includes a stationary gantry and a rotating gantry G, which is rotatably supported by the stationary gantry. The rotating gantry G rotates around an examination region, about a longitudinal or z-axis. The examination region is formed as an opening or bore B in the rotating gantry G.

A subject support BD, such as a couch, supports a subject or object in the examination region and can be used to position the subject or object with respect to x, y, and/or z axes before, during and/or after scanning A radiation source XR, such as an X-ray tube, is supported by the rotating gantry G and rotates with the rotating gantry G about the examination region, and emits radiation, via a focal spot, that traverses the examination region.

In one embodiment, there is also a source collimator disposed between the radiation source XR and the examination region and collimates the emitted radiation to produce a generally fan or, wedge, cone, or otherwise shaped X-ray beam XB.

The radiation beam XB is centered about an iso-center ISO of the bore B and defines a generally circular shaped field of view FoV (of the scanner) to reconstruct for a transverse reconstruction plane RP, which is generally perpendicular to a center ray of the beam XB and which extends through the iso-center ISO.

A radiation sensitive detector array D is located opposite the radiation source XR, across the examination region. The detector array D includes one or more rows of detector pixels or cells, that detect radiation traversing the examination region and generate an electrical current or voltage signal indicative of the detected radiation. The detector pixels may be formed form integrating detectors or photon counting detectors.

Rotation of rotatable gantry (and thus of at least the X-ray source's focal spot—in a fourth generation scanner it is only the tube that rotates in the gantry, with the detector array fixedly arranged to line all of the inside of the gantry to that at least a port of the detector can receive radiation for any rotation angle), is effected by one more controllers and/or one or more drive systems (e.g., a motor, a coupling, etc.).

During an imaging run when the scanner is in use, focal spot rotates through a predetermined angular range on a path (in general an arc or a full circular rotation) around bore B and hence subject or object PAT therein at a given angular frequency during a scan of the subject or object. For each rotation angle $\phi$, the detector detects the radiation emitted by the focal spot after passage through the subject or object at said angle.

The radiation experiences attenuation during passage through the subject or object with said attenuation proportional to the local densities of the subject or object. Each cell (opposite focal spot) that is struck by an individual ray (of which said radiation beam is made up) responds by issuing a corresponding electric signal s briefly mentioned above. The collection of said signals is then translated by a data acquisition system DAS into a respective digital value representative of said attenuation. The collection of the so registered digital values for each (X-)ray are then consolidated into an array of digital values forming a 2D (two-dimensional) X-ray projection image for a given acquisition time and projection angle φ. The detector D thereby records a collection of projection images, one or more for each rotation angle φ. The arrangement as proposed herein further includes an image processor IP to image process the collection of projection images so acquired. More specifically there is a reconstructor RECONX (of which more later) that is operative to reconstruct the collection of projection images based on a plurality of reconstruction algorithms and generates transaxial cross sectional images ("slice (image)") for each axial position z, The collection of transaxial slice images can then be combined into volumetric image data indicative of the examination region and at least a portion ROI of the subject or object therein. Said more formally, a reconstruction algorithm is a transformation from "projection space" into "image space". "Projection space" is the space of all projection views of an object, and includes in particular the projection images acquired by the scanner, whereas the "image space" is the space of all transaxial slice images where each pixel corresponds to a point in the scanner's s FoV.

As can be seen in FIG. 1, the width or diameter of the field of view FoV is in general a function of the width (defined by number of rows/columns that make up the detector sensitive surface) of the detector sensitive surface and/or the width of the radiation beam XB and/or the collimation setting used in the image acquisition. In most scanners, the field of view FoV has a markedly smaller diameter than the bore. This mutual bore/FoV relationship defines an annular out-field-of-view region A. For instance, usual CT bore diameters are in the region of 70 cm whereas the scanner's FoV measures up to about 50-60 cm in diameter, which results in an annular region A with radial width of about 10-20 cm. What can also be taken from FIG. 1 is that the object PAT or other objects in the bore B may not necessarily fit for each rotation angle into the field of view FoV. An example for such an "oversized" object PAT cross section is shown as an ellipse in FIG. 1. In other words, one or more of the projection images are incomplete or cut-off as the detector records the region of interest only partly for certain views φ.

It has been observed by Applicant that certain reconstruction algorithms are highly sensitive in terms of the faithfulness of their construction, when fed with such incomplete projection images. In particular, it has been observed that the sensitivity to incomplete projection data is most prevalent with ROI-based reconstruction algorithms, that are, those reconstruction algorithms that are geared to reconstruct only for a certain subregion of the scanner FoV rather than for the whole of the scanner's FoV. It is therefore proposed herein to arrange reconstructor as a hybrid or multimodal reconstructor RECONX that is conditionally switchable between two or more different reconstruction algorithms. More specifically, the decision whether or not to switch, is a function of the amount of material that resides in the annular out-of-field of view region A. For instance, in statistical iterative reconstruction (SIR) methods for CT, region of interest reconstruction is of high importance, since these SIR methods are slow compared to direct inversion reconstruction methods like filtered back projection (FBP). At the same time, SIR may deliver higher contrast to noise ratio imaging results at equivalent dose compared to direct inversion methods. For instance, a method (in the following referred to as "method A") for iterative region of interest reconstruction used in one embodiment includes the following steps to be applied to a set of acquired projection images:

1. Reconstruction of the complete field of view of the scanner with filtered back projection FBP.
2. Cutting out (for instance by masking) the region of interest for the iterative reconstruction. The remainder or border of the cut-out may be smoothened by fitting a sufficiently smooth boundary to the boundary left by the cut out.
3. Forward projecting the remaining image to generate "synthetic" projections view of the object without the ROI.
4. Subtracting the forward projected object without ROI from the original projections and thus generate a set of ROI-only-projections.
5. Use SIR or similar high fidelity reconstructions to reconstruct the ROI projections by optionally using noise estimates from the originally acquired projection image data.

A similar reconstruction has been proposed by A. Ziegler, T. Nielsen, and M. Grass in "Iterative reconstruction of a region of interest for transmission tomography", published in Med. Phys. 35 (4), 2008, pp. 1317-1327.

The method according steps 1-5 as outlined above has been found to deliver satisfactory results only when the object is completely inside the FOV. However as a matter of practical reality, there is almost always parts of the object that are outside the scan field of view, that is, reside in the annular region A. Reasons for out-of-field-view material are, for instance, that the object to be imaged, such as a patient, may happen to be positioned asymmetrically with respect to the iso-center and the imaging axis z therethrough or the patient may happen to have a rather high BMI (body-mass-index). However, it may be the case that other parts (not necessarily physically connected to, that is, not necessarily part of, the object to be imaged) reside in the annular region A during the image acquisition such as at least parts of the couch B, cables or blankets or some medical equipment. In these cases, the presence of material outside the FOV compromises the image quality or fidelity, in the field-of-view and in particular in the ROI reconstructions. On the other hand reconstruction algorithms that are computationally efficient, such as the direct inversion method based FBP reconstruction, does unfortunately not deliver an accurate enough estimate of the part of the object outside the FoV when using incomplete projection data. It is therefore proposed herein a conditional switching to a method B reconstruction in case there is out-of-FoV-material resident. Method B reconstruction involves modifying step 1 of method A. In other words, the modified step 1 of method B as proposed herein includes reconstruction of the full bore or scanner FoV with FBP followed by a single (or more) iterations of ART (algebraic reconstruction technique). It has been found, that the ROI reconstruction of method B delivers better estimates of the object outside the FOV when there is material resident in the outside the FOV but inside the bore, that is, there is material in the annular region A. However, the so modified step 1 (as compared to step 1 of method A) is computationally more expensive than step 1 of method A.

Thus, it is of interest to decide for each image data set which reconstruction approach A or B is to be used for step 1 to keep the processing speed and image quality as high as possible. In other words the image processing apparatus IP as proposed herein helps better negotiate the tradeoff between computational complexity and required CPU time on the one hand, and accuracy and high signal-to-noise ratio on the other.

The image processing module IP as proposed herein includes an input port IN and output port OUT, the multi-modal reconstructor RECONX briefly mentioned above, and an out-of-FoV determiner OFD that is configured to issue a decision on which one of the two or more reconstruction algorithms is to be used by the multimodal reconstructor RECONX for an instant set of projection images to be reconstructed into a slice. The determiner OFD is configured to establish or measure the amount of material that resides in the annular region A whilst the instant set of projection images has been acquired. If the amount thereof is determined not to exceed a user configurable (or fixed, preset) material threshold, a first reconstruction algorithm is run. If however it is found that the material in the annular region is in excess of the preset threshold, a second (for instance B) more suitable reconstruction algorithm is run instead. In other words the first algorithm is one that is more tolerable towards material in the annular region (perhaps at the expense of image quality and signal to-noise-ratio), whereas the other second algorithm delivers more accurate results at high signal-to-noise ratios but is more sensitive for incomplete projection data.

Briefly, in operation, after a current set of projection images has been acquired by the scanner, the projection images are forwarded to the image processer IP and is received at input port IN. Out-of-field of view determiner OFD then determines the amount of material in the annular region in a manner to be described in more detail below. Depending on whether the amount is or is not within the threshold, the first or second registration algorithm is used for the instant projection image set. Image processing module then listens for a new set of projection images to be received at its input port, and the previous steps are then repeated for a new set of projection images.

It is proposed herein, that the out-of-field of view determiner OFD operates in image space to measure the amount of outer field of view material. To this end according to one embodiment, a computationally cheap FBP reconstruction is run (similar to step 1 of the ROI reconstruction method above) to reconstruct, from the current projection images, the full FoV in an exploratory phase to obtain an exploratory slice image to cover as much of the image space in the bore as possible. In other words, determiner OFD operates not on the projection images themselves but operates instead on the exploratory reconstructed image.

The determiner OFD examines for non-zero outer fringe portions in the reconstructed exploratory that represent the annular region A. "Outer" in this context refers to a radial direction away from the iso-center ISO. In yet other words, the determiner OFD checks whether the corresponding outer fringe portion in the reconstructed exploratory image is non-zero or larger than a threshold. The rationale behind this checking for said nonzero image information is that, if there is a situation where there is indeed material in the annular region A, this situation will be evidenced by a non-zero fringe portion because the exploratory image does not "die off" towards its border or fringe portion as would be the case if there was no material present in the annular region A.

The annular region can be identified in this exploratory image with high accuracy because the dimensions of the scanner's FoV are known.

In this initial, exploratory, reconstruction, a number of different sample measurement are taken in order to establish the amount of material in the annular region. To do this, a number of different "measurement protocols" are envisaged herein which will now be explained in more detail with reference to FIGS. 2 through 6.

Figure 2:
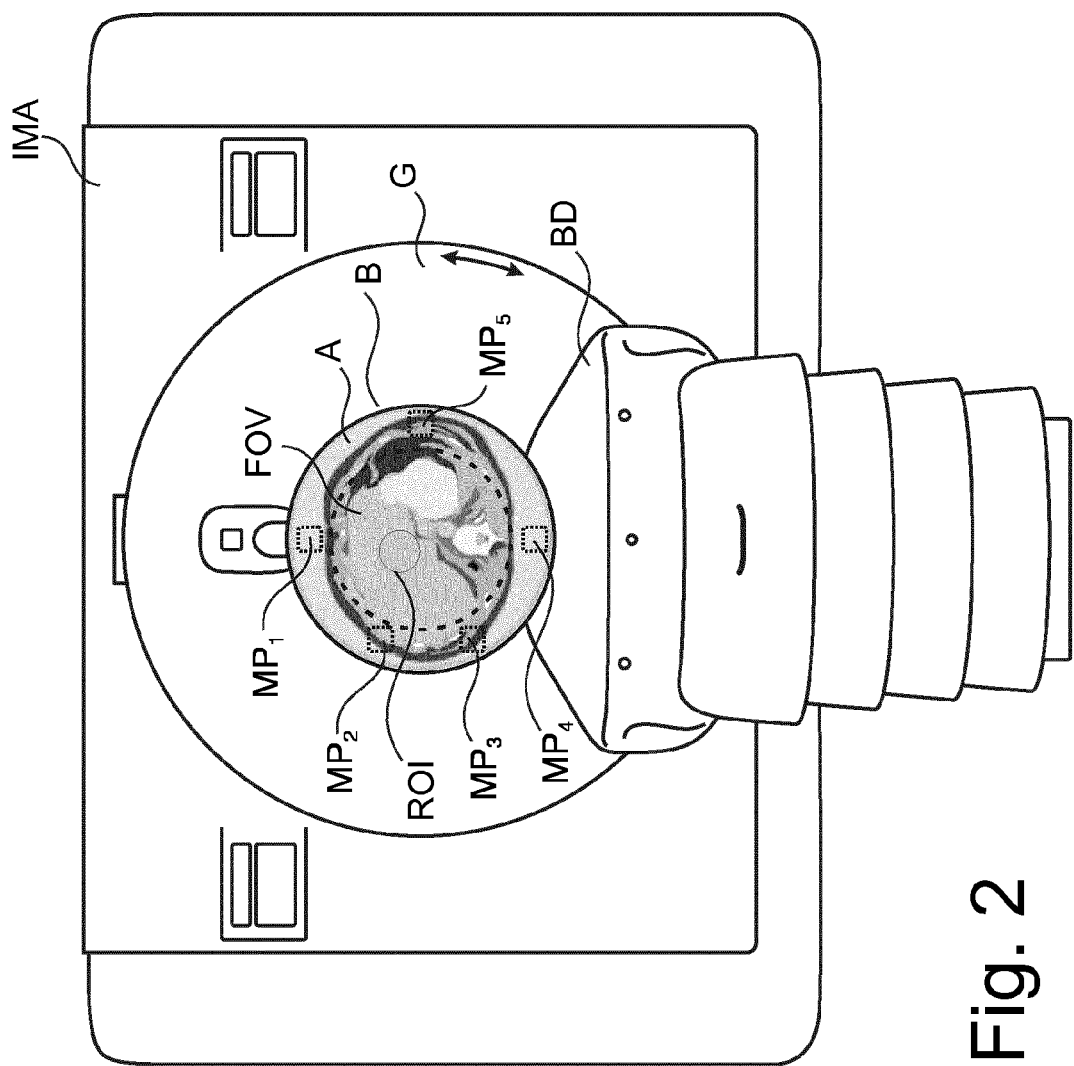
FIGS. 2-6 each show different embodiments for measuring the amount of out field of view material for CT imaging.

With reference to FIG. 2, there is shown an out-of-FoV measurement sampling, where the amount of the material is measured at unevenly (for example randomly distributed) distributed measurement spots in the annular region in the form of cubic portions or any other suitable geometric form. In one embodiment the measurement spots MP1-4 are user defined. For instance in this embodiment the exploratory FoV reconstruction is rendered for display on monitor M, and the user clicks by a suitable pointer tool such as a mouse or similar to select the portion he wishes to be measured. The grey values (or otherwise) carried by each voxel or pixel in the annular region A is then established. If grey values at the measurement spot MP in the annulus A are found to exceed a certain pixel or voxel threshold, those pixels or voxels are marked up as indicative of materials present at that pixel voxel. The values of each of the so marked up pixels or voxels are then summed up to form a critical cumulative value. This cumulative value is then compared with the user adjustable critical threshold value. If the critical threshold value is exceeded, a decision is issued to reconstructor RECONX to re-reconstruct the current set of projection images according to method B because it has been found that there is enough out of field of view material present that would warrant the higher computational expense incurred by method B due to the presence of the ART iteration in step 1 of method B. If however it is found that the values of the added up marked-up pixels or voxels are below the critical threshold, reconstructor RECONX is instructed to reconstruct by using the computationally cheaper method A because either there is no material present in the annular region A or the amount of material that is present does not warrant the higher computational expenses as per method B. However rather than computing the sum of individual non-zero responses of the individual measurement points as mentioned earlier, the decision to switch or not may also be based on evaluating each measurement responds separately and to switch as soon as one measurement response is found to exceed the threshold.

Figure 3:
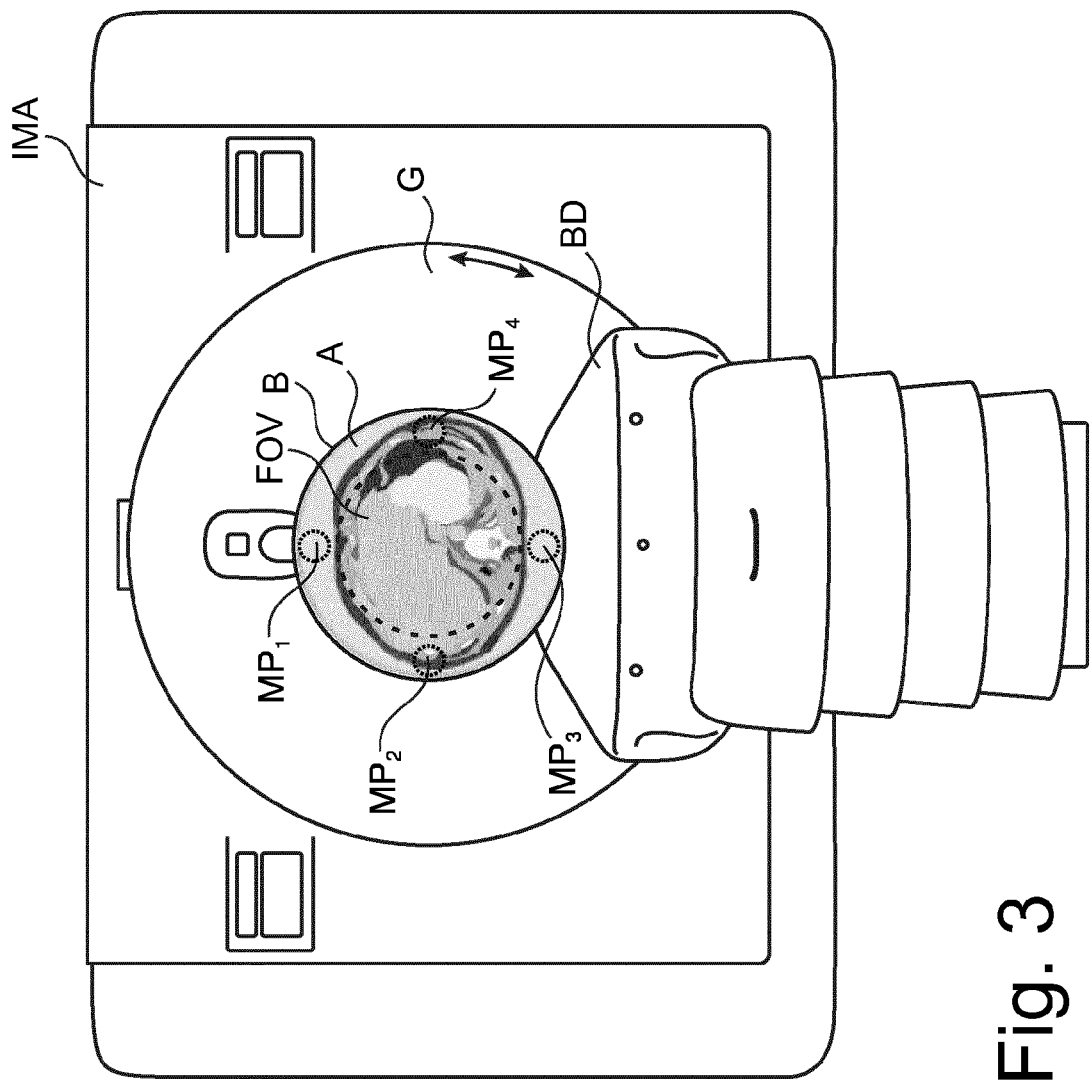

Reference is now made to FIG. 3, which is similar to FIG. 2, but in the FIG. 3 embodiment the measurement spot MP1-4 are now evenly distributed over the annular region A at user definable angular intervals. For instance, as per FIG. 3 embodiment, the amount-of-material measurements are carried out at 12, 3, 6 and 9 o'clock which correspond to angular measurement intervals of 90°. However other, coarser or finer, angular intervals are also envisaged herein. Also the, the measurement spots MP1-4 may be defined by circular rather than cubic or cuboid regions as was the case in FIG. 2.

It can be seen In FIGS. 2,3, that in the measurement spots at 3 and 9 o'clock return non-zero response due to the material in the annular region A whereas the measurement spots at 12 and 6 o'clock respond with zero.

Figure 4:
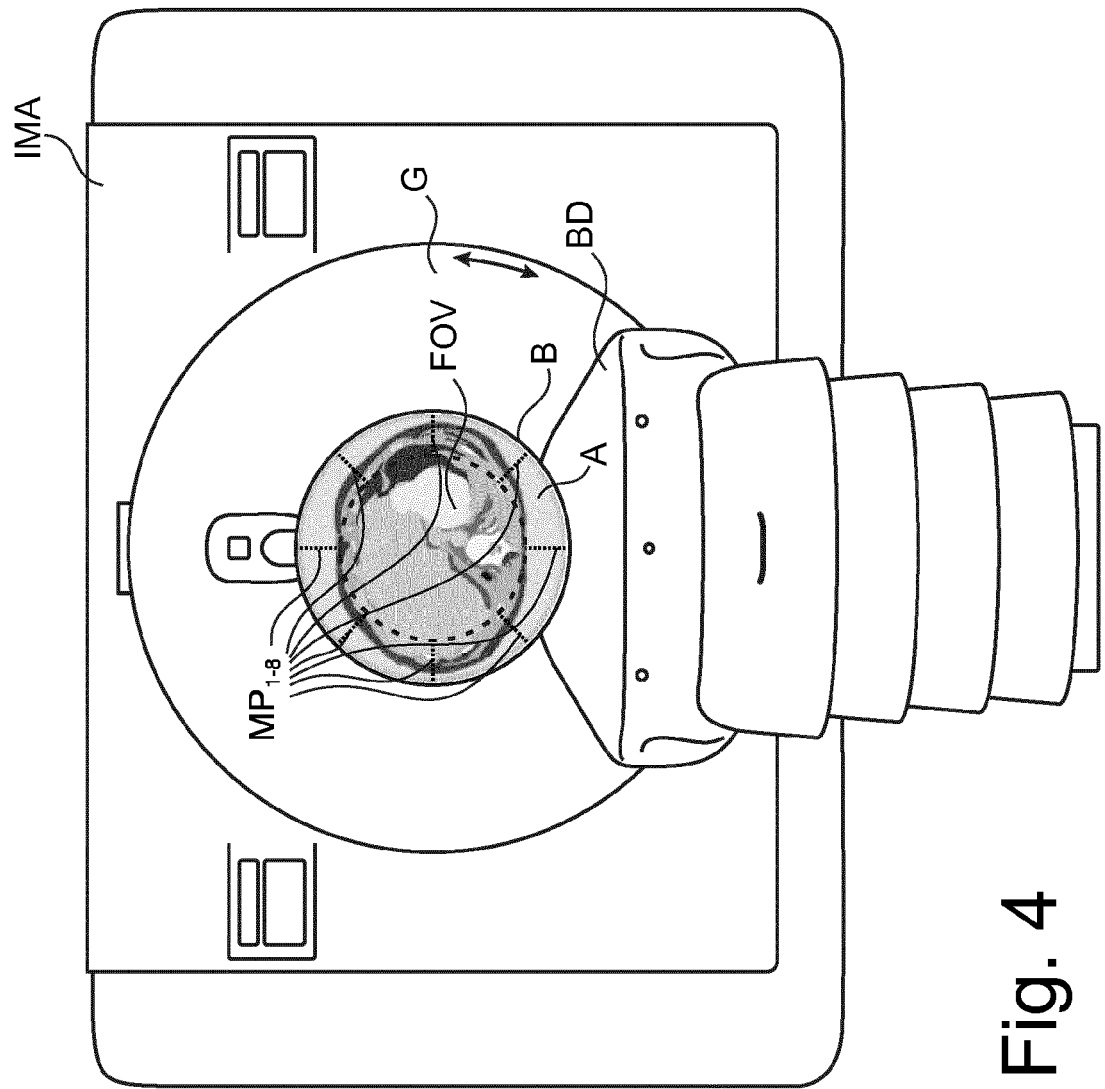

FIG. 4 shows a further embodiment for measurement spots MP1-4, in which said measurement spots now extend radially as "strips" across the annular region at regularly spaced angular intervals. However an arrangement at irregular intervals (user selected or random) is also envisaged.

Also, the length or width of the measurement strips MP1-4 can also be user adjusted by the user in one embodiment by supplying corresponding user input via a user interface for instance a graphical user interface or by keyboard input or otherwise.

Figure 5:
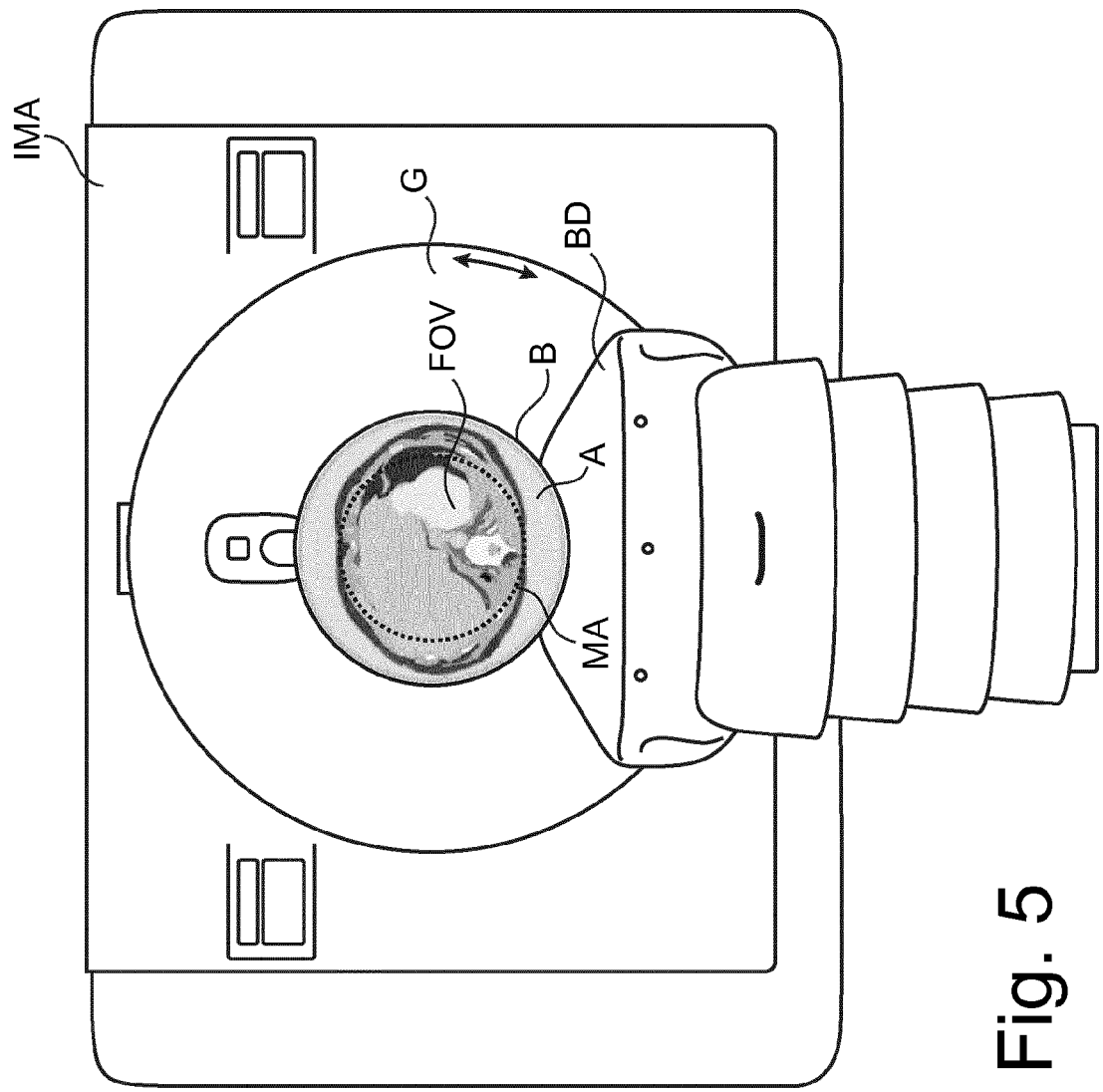

FIG. 5 shows a further embodiment for measurement spots MP1-4, in which the individual measurement spots are effectively "coalesced" in a closed loop measurement area MA around the field of view with the user adjustable radial width.

Figure 6:
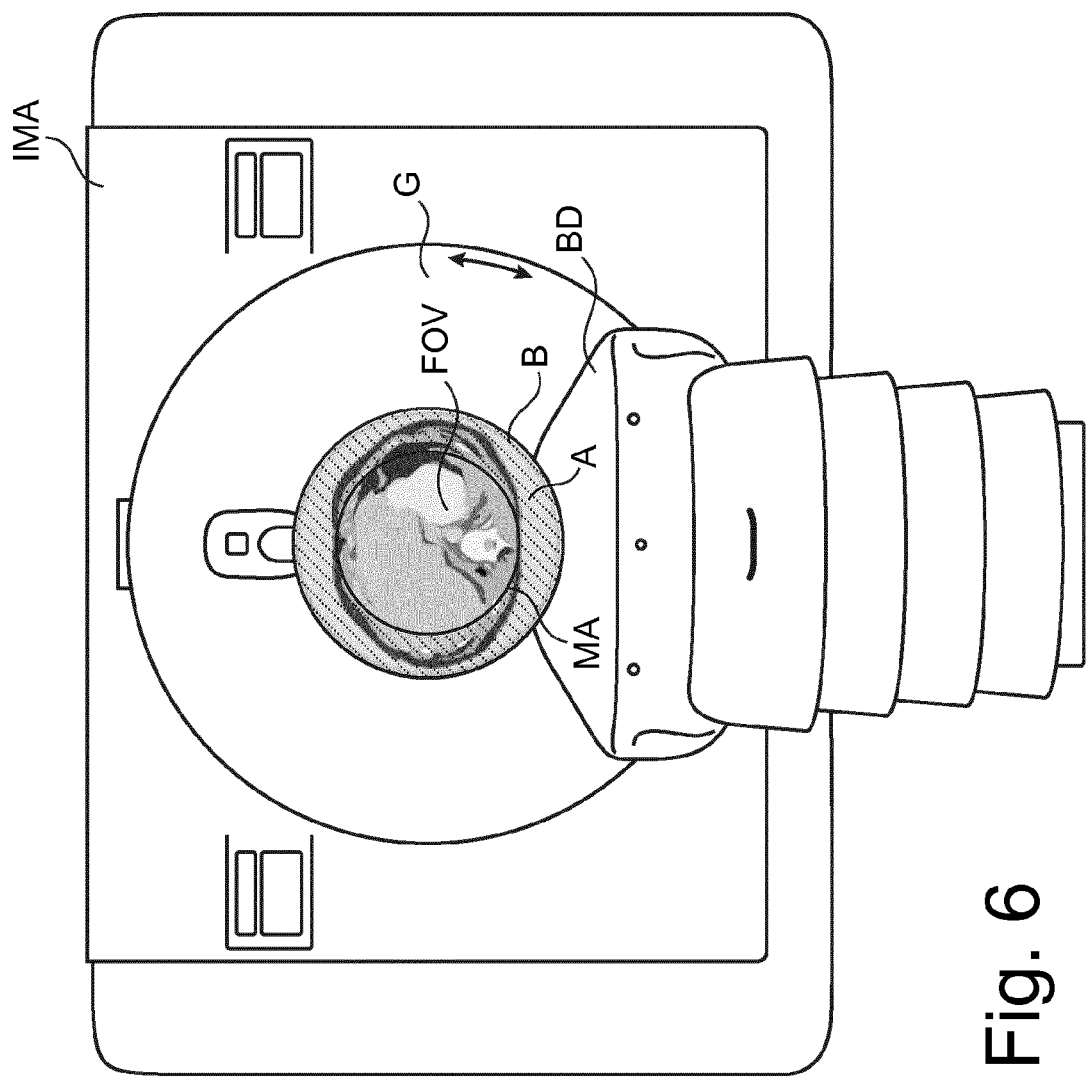

FIG. 6 shows an extreme example of FIG. 5, where the "loop" width has been enlarged into a connected measurement are MA to now essentially cover the entirety of the annular region A. That is, according to FIG. 6, it is the whole of the annular region A that is measured. In other words, FIG. 6 shows the computationally most expensive measurement sampling protocol as compared to the previous, locally restricted, sampling protocols as per FIGS. 2 through 5.

According to one embodiment the image processing module IP further includes an optical camera OC. In this embodiment, the exploratory image is acquired with non-ionizing radiation from the object or subject in the scanner bore. It is then this optical image that is used to establish whether there is excessive material extending into the annular region A. This optical image-based variant uses the known bore and field of view dimensions to compute the material in the annular region. Because the bore-camera distance, and relevant optical parameter settings of the camera are known, the iso-center ISO position, the bore B's and/or FoV's dimensions can be scaled to the image to compute the material in the annular region. The evaluation is then based on comparing image pixels in the optical image as previously explained in respect of the grey values in the FBP reconstruction. According one embodiment, the optical camera is a depth sensing camera. However other cameras based on non-ionizing radiation such as infrared or similar are likewise envisaged herein. In one embodiment the optical camera is arranged in the scanner's gantry G, or is arranged along the longitudinal axis z outside the imager's bore B so that the optical image is required along the z-axis whilst the object/patient PAT resides in the bore so that the optical image affords a view similar as the side elevations shown in FIGS. 2 through 6.

In one embodiment, the resolution for the full bore/FoV reconstruction for the exploratory image may be limited to a fraction of the resolution of the ROI reconstruction to so further computational time. Accordingly, for the embodiment with the optical camera, the camera's resolution can be set lower setting for the exploratory bore image than the resolution for the subsequent reconstruction. It is envisaged herein that the image processing model includes a user interface by means of which the user can adjust the resolutions to be used for either for either one of the plurality of reconstruction algorithms.

It should be understood herein that the proposed methods A and B are exemplary embodiments, and other direct inversion, iterative or statistical reconstruction algorithms can be used in place of A and B instead within the framework the proposed image processing module with multimode reconstructor.

Also, as is indeed the case for method A and B as proposed herein, the respective reconstruction algorithms for method may be of a mixed type, that is, they may include elements, in combination, of direct inversion reconstruction, algebraic reconstruction and or statistical reconstruction. What matters herein is that one reconstruction algorithm is less sensitive to the presence of out of field of view material than is the other. The out-of-field-of-view-material sensitivity can be readily established for any two given algorithms by applying each to projection images of a phantom with a defined amount of out of field material. The reconstructions can then be compared with the original phantom, for instance by taking the respective difference images, to so establish which one of the two delivers the more faithful result. In the specific reconstruction methods A,B according to one embodiment, the exploratory FBP reconstruction is part of ROI reconstruction method A and therefore need not be rerun if it is decided by determiner OFD to finally go ahead with method A. If however, determiner OFD decides for method B, there will be a single or more ART iterations based on the FBP reconstructed exploratory image. ART normally operates on a "null image" as an initial input. However here, in step 1 of method B, ART uses instead, as its initial input image, the FBP reconstructed exploratory image. In ART, the FBP reconstructed exploratory image is forward-projected along one direction, and the pixel-wise difference is then computed for the corresponding one of the actually measured projections. This difference image information is then "smeared" back into image space to so update the initial FBP image. This procedure is then repeated for each projection direction. In one embodiment, the SART variant of ART is used, which is similar to ART, but in SART the forward projection step is executed simultaneously for a plurality of directions rather than for each direction separately and sequentially as in ART.

The components of image processing module IP may be resident in work station CON running thereon as software routines The components may also be arranged as dedicated FPGAs or as hardwired standalone chips.

The components may be programmed in a suitable scientific computing platform such as Matlab® or Simulink® and then translated into C++ or C routines maintained in a library and linked when called on by work station WS.

Alternatively, IP module may be centrally arranged on a server to serve various work stations centrally. Also the various components RECONX, OFD may likewise be outsourced to that the IP module is effectively arranged in a distributed architecture and connected in a suitable communication network.

Figure 7:
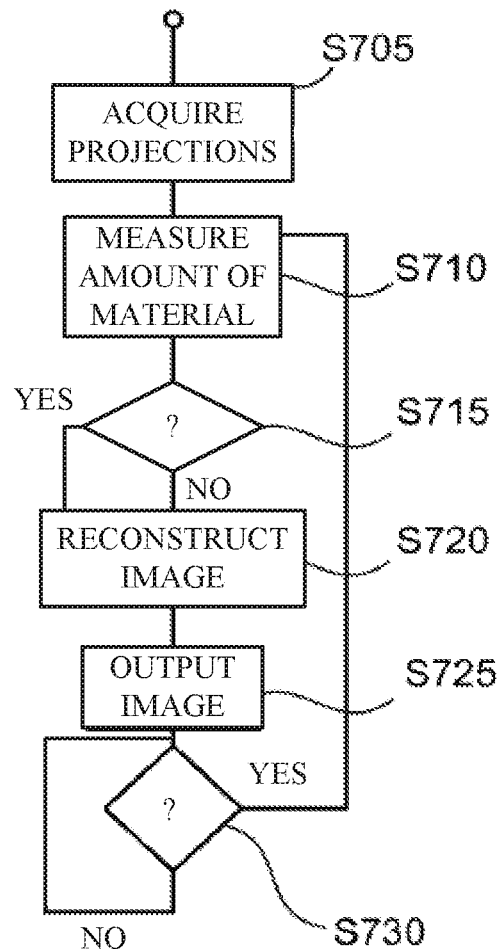
FIG. 7 is a flow chart for a method of image reconstruction.

With reference to FIG. 7, a flow chart is shown for the basic steps of an image processing method as proposed herein.

In step S705, a set of projection images acquired by a CT image scanner are received. The image scanner has a field of view inside the bore and it is assumed that during the image acquisition a patient or object to be imaged is resident in the bore with at least part of the object or patient inside the field of view.

In step S710, the amount of material in the annular region formed between the bore and the imager's scan FoV is measured. Material in said annular region, that is, "out-of-field-of-view" material, may stem from the object or patient itself or may be formed by a separate object likewise resident in the bore whilst the projection images are acquired. In one embodiment, the measurement is carried out on an exploratory reconstruction image of the full field of view of the scanner. In a different embodiment, the measurement is established instead based on an optical image taken of the bore (with the to-be imaged object PAT in it) by a camera based on non-ionizing radiation.

In step S715, a switchover occurs from a first reconstruction algorithm to a second reconstruction algorithm, if it is established in step S710 that the material in the annular region is in excess of a predefined threshold. The second reconstruction algorithm is less sensitive to the presence of material in the annular region then is the first reconstruction.

If it is found that the amount of material in the annular region is not in excess of the threshold, no switchover occurs.

In step S720, the image is reconstructed according to the second reconstruction algorithm, or the image is reconstructed according to the first registration algorithm depending on the outcomes as per step S715.

In step S725, the reconstructed image is output, for instance rendered for display on a display unit such as monitor or the image is otherwise image processed.

In step S730, it is listened for whether a new set of projection images is received. If a new set of projection images has been received, the previous steps S710-S725 are repeated for the newly received set of projection images.

Figure 8:
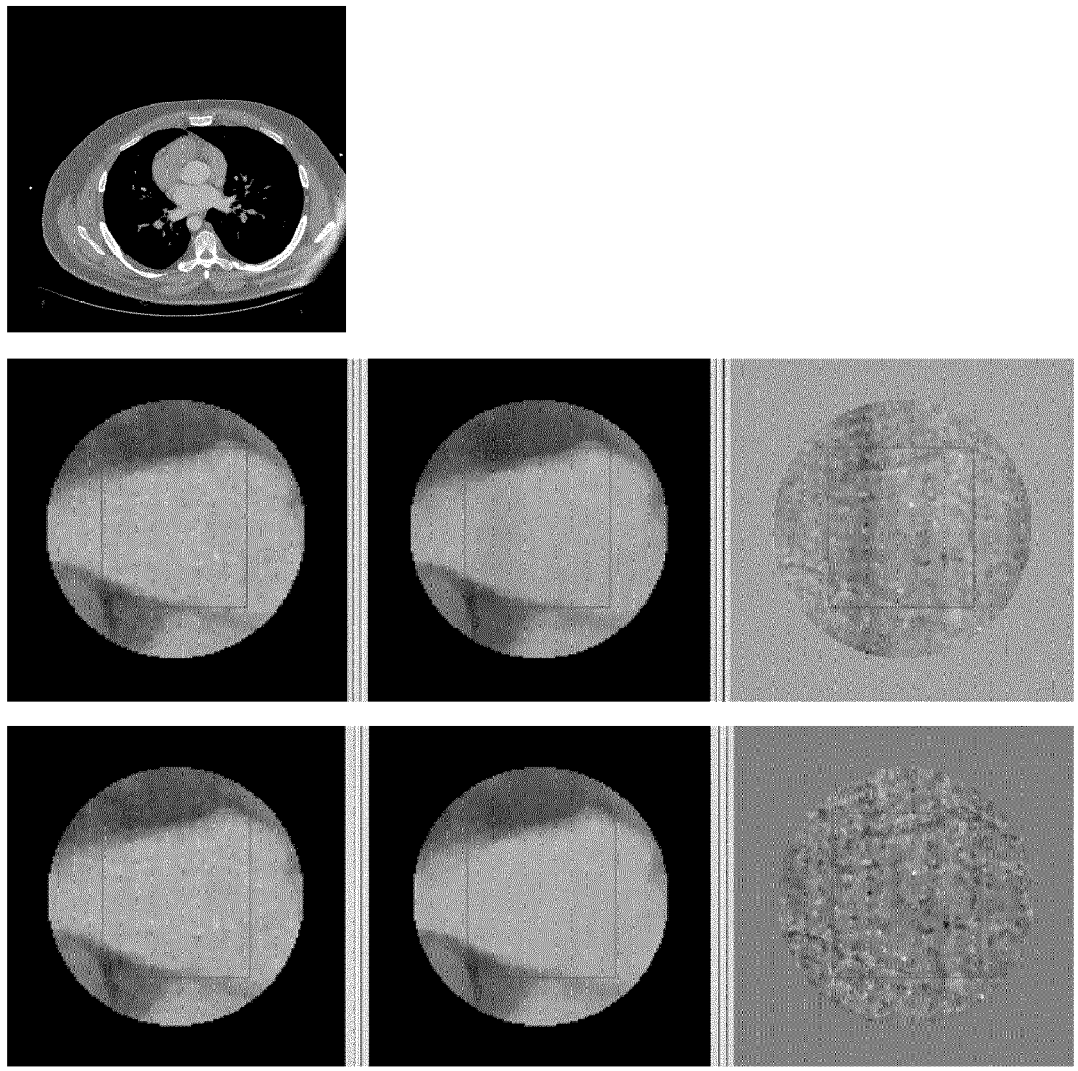
FIG. 8 shows results of different reconstruction methods as applied to clinical data.

Image processing results of method A and B for clinical data are shown in FIG. 8.

The upper image shows transaxial cardiac step and shoot data set with parts of a patient extending outside the FOV. "Step-and-shoot" is an imaging protocol where couch BD remains stationary while the X-ray tube and gantry rotate about the patient. When the data acquisition is completed for one location, the table is indexed to the next location for the subsequent scan.

The middle row (from left to right) shows in the left panel an iterative reconstruction of the complete bore cut out to the region of interest. The central panel shows a region of interest reconstruction using FBP for the complete bore which correspond to method A; The right panel shows the (pixelwise-)difference image which evidences the remaining artifacts, with mean difference of about 20 HU. The differences are taken for pixels inside a respective measurement windows outlined as rectangles inside the images.

The lower row (from left to right): in left panel there is shown an Iterative reconstruction of the complete bore cut out to the region of interest; the middle panel shows a region of interest reconstruction using FBP and a single iteration ART for the complete bore which corresponds to method B. Again, the right panel is the pixelwise difference image. Now the mean difference is at approx. 1 HU. In other word, method B delivers image data at a roughly 20-fold higher fidelity (although at higher computational cost) than method A does, for the situation where there is out-of-field-of-view material residing in the bore. Determining the amount of out-of-field-of-view material allows using switching between the two methods. In other words, computationally more expensive method B can be used more efficiently if a sufficient amount of out-of-field-of-view material has been detected. In case no (or not enough) out-of-field-of-view material is detected, and one can fall back to the computationally cheaper method that still delivers good results in this case. Whether or not out-of-field-of-view material is judged excessive depends on the circumstances at hand and can be adjusted by modifying the threshold value.

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above-described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an up-date turns an existing program into a program that uses the invention.

Further on, the computer program element might be able to provide all necessary steps to fulfill the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium, such as an optical storage medium or a solid-state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. An apparatus for computed tomography image reconstruction of an object, comprising:
an image processor, including:
an input port configured to receive a plurality of projection images of an object acquired by an imager, each of the projection images being along a different projection angle with respect to a field of view, FoV, wherein the object resides in a bore of said imager with at least a part of said object inside the FoV;
a reconstructor configured to reconstruct the plurality of projection images to generate an image with a first reconstruction algorithm or with a second reconstruction algorithm;
an out-of-FoV-determiner configured to measure an amount of the object in a region between the bore and the FoV and instruct the reconstructor to employ the first reconstruction algorithm to reconstruct the image in response to the amount failing to exceed a predetermined threshold and employ the second reconstruction algorithm to reconstruct the image in response to the amount exceeding the predetermined threshold;
an output port configured to output the reconstructed image.

2. The apparatus for image reconstruction of claim 1, wherein the first reconstruction algorithm includes a reconstruction of the full field of view.

3. The apparatus for image reconstruction of claim 1, wherein the reconstruction according to the first or the second reconstruction algorithm is a region of interest, ROI, only reconstruction.

4. The apparatus for image reconstruction of claim 1, wherein the reconstruction according to the first reconstruction algorithm is at a first resolution and the reconstruction according to the second reconstruction algorithm is at a second resolution, and the first resolution is less than the second resolution.

5. The apparatus for image reconstruction of claim 1, wherein the first reconstruction algorithm delivers a first signal to noise ratio and the second reconstruction algorithm delivers a second signal to noise ratio, and the first signal to noise ratio is higher than the second signal to noise ratio.

6. The apparatus for image reconstruction of claim 1, wherein the first or second reconstruction algorithm includes filtered back projection, FBP, reconstruction algorithm.

7. The apparatus for image reconstruction of claim 1, wherein the first or second reconstruction algorithm includes an iterative reconstruction algorithm.

8. The apparatus for image reconstruction of claim 7, wherein the iterative reconstruction algorithm is a statistical iterative reconstruction, SIR, algorithm.

9. The apparatus for image reconstruction of claim 1, wherein the second reconstruction algorithm further includes an algebraic reconstruction algorithm, ART.

10. The apparatus for image reconstruction according to claim 1, wherein the amount of the object outside of FoV is measured by an optical camera.

11. The apparatus for image reconstruction according to claim 1, wherein the measurement operation of the out-of-FoV-determiner includes instructing the reconstructor to reconstruct an exploratory image of the full field of view by using a third reconstruction algorithm or by executing at least a part of the first reconstruction algorithm, wherein the out-of-FoV measurement is at discrete locations in the region as per the exploratory image or wherein the out-of-FoV measurement is over a whole of the region as per the exploratory image.

12. An image processing method, comprising:
receiving a plurality of projection images of an object acquired by an computed tomography imager, each of the projection images being along a different projection angles within a field of view, FoV, wherein said object resides in a bore of said imager with at least a part of said object inside the FoV;
measuring an amount of the object in an annular region outside the FoV and inside of the bore;
selecting a first reconstruction algorithm if the measured amount fails to exceed a threshold;
switching from the first reconstruction algorithm to a second reconstruction algorithm, if the measured amount exceeds the threshold;
reconstructing the plurality of projection images to generate an image according to the first or second reconstruction algorithm; and
outputting the image.

13. A non-transitory computer readable medium having stored thereon a program with computer executable instructions which when executed by a computer causes the computer to:
receive a plurality of projection images of an object acquired by an computed tomography imager, each of the projection images being along a different projection angle within a field of view, FoV, wherein said object resides in a bore of said imager with at least a part of said object inside the FoV;
measure an amount of the object in an annular region outside the FoV and inside of the bore;
select a first reconstruction algorithm if the measured amount fails to exceed a threshold;
switch from the first reconstruction algorithm to a second reconstruction algorithm, if the measured amount exceeds the threshold;
reconstruct the plurality of projection images to generate an image according to the first or second reconstruction algorithm; and
output the image.

14. The image processing method of claim 12, wherein the first reconstruction algorithm includes a reconstruction of the full field of view.

15. The image processing method of claim 12, wherein the reconstruction according to the first or the second reconstruction algorithm is a region of interest, ROI, only reconstruction.

16. The image processing method of claim 12, wherein the reconstruction according to the first reconstruction algorithm is at a first resolution and the reconstruction according to the second reconstruction algorithm is at a second resolution, and the first resolution is less than the second resolution.

17. The image processing method of claim 12, wherein the first reconstruction algorithm delivers a first signal to noise ratio and the second reconstruction algorithm delivers a second signal to noise ratio, and the first signal to noise ratio is higher than the second signal to noise ratio.

18. The image processing method of claim 12, wherein the first or second reconstruction algorithm includes filtered back projection reconstruction algorithm.

19. The image processing method of claim 12, wherein the first or second reconstruction algorithm includes one of an iterative reconstruction algorithm or an algebraic reconstruction algorithm.

20. The image processing method of claim 12, further comprising:
    measuring the amount of the object outside of FoV with an optical camera.

* * * * *